Nov. 20, 1923.　　　　　　　　　　　　　　　　　　　1,474,881
H. BARKSCHAT
PROCESS OF FORMING HOLLOW CONCRETE BODIES
Filed Aug. 8, 1919
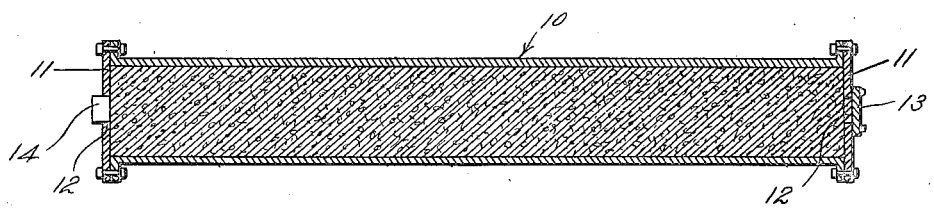
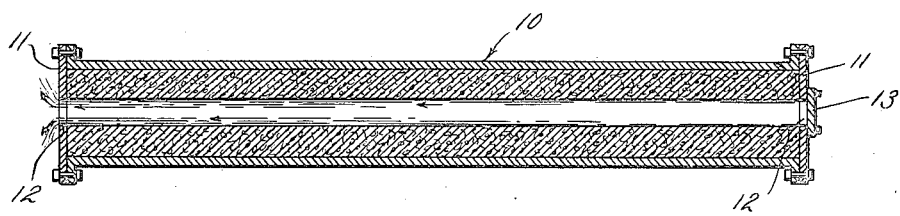
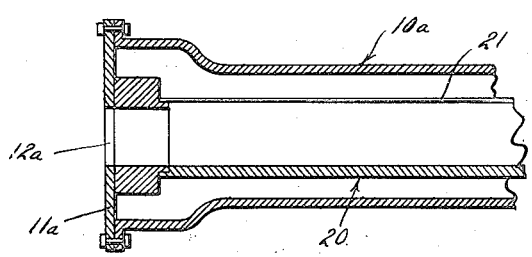　　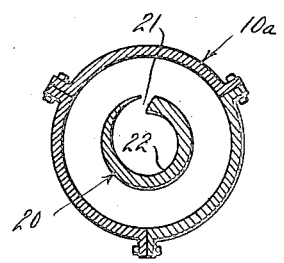
Inventor
Henry Barkschat
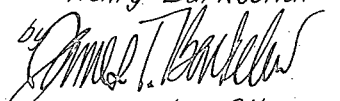
his Attorney Patented Nov. 20, 1923.

1,474,881

UNITED STATES PATENT OFFICE.

HENRY BARKSCHAT, OF LOS ANGELES, CALIFORNIA, ASSIGNOR OF ONE-HALF TO EDMUND B. BLINN, OF PASADENA, CALIFORNIA.

PROCESS OF FORMING HOLLOW CONCRETE BODIES.

Application filed August 8, 1919. Serial No. 316,046.

*To all whom it may concern:*

Be it known that I, HENRY BARKSCHAT, a citizen of the United States, residing at Los Angeles, in the county of Los Angeles, State of California, have invented new and useful Improvements in Processes of Forming Hollow Concrete Bodies, of which the following is a specification.

This invention relates to the centrifugal process of forming concrete or other plastic composition bodies such as posts, poles, pipes and the like—in fact, any article adapted to be formed by such a process as herein explained; and one of the primary objects of the invention is the making of such process as will cause, prior to and during the setting of the cementitious or plastic material, the removal of the impurities which are present in the cement or in the cement and other aggregates which go to make up the complete cementitious mixture. In all plastic materials, such as cements, and also in bodies of aggregates used for concrete, there is present a comparatively small amount of impurities which, however, have a very deleterious effect upon the finished concrete if allowed to remain therein. These impurities are generally known, and I shall herein designate them as "laitance;" and they are composed very largely or wholly of a very finely powdered substance or substances which have no value whatever in cement or in concrete and which, on the other hand, very substantially weaken the finished concrete bodies, and also very materially retard the setting of the concrete. These impurities are of such nature as to be fairly easily carried in suspension in water; and they are usually of lesser specific gravity than either the cement itself or the aggregates used in the formation of concrete.

I have devised and perfected a method of removing these impurities from the plastic or cementitious mixture during the formation of concrete bodies by the centrifugal process; and I find that I can thereby more quickly form and set a concrete post, pipe or any other body and that the finished article has a great deal more strength than concrete articles which are formed in the ordinary manner and in which the impurities remain. The process itself will be best understood from consideration of the following detailed description of a specific form of my process as applied to the formation of a concrete post or the like, in, for instance, such a process and with such a mold as shown in the two Patents Nos. 1,299,842, and 1,299,739, dated April 8, 1919, on molds for reinforced concrete posts or the like, and method of forming reinforced concrete posts or the like, reference for this purpose being had to the accompanying drawings in which—

Fig. 1 is a longitudinal section illustrating a simple form filled with an un-set cementitious mixture, as the same may appear at the beginning of the process; Fig. 2 is a similar view illustrating the disposition of the material during the period of setting; Fig. 3 is a longitudinal section, and Fig. 4 is a transverse section, of another form of mold in which my process may be carried out.

In Fig. 1 I show a simple form of mold which comprises a cylindrical body 10 and heads 11. It will of course be understood that this mold may typify any mold of the general character herein described; the particular form and configuration of the mold or of the finished product formed therein is not a limitation upon my invention. Such molds usually have openings 12 in their ends and these openings may be closed either by a plate 13 or by a plug 14. As a typical illustration of the application of my process, I may say that I use it, in one instance, as applied to the formation of hollow concrete posts, the average external diameter of which is about nine inches and the diameter of the interior being about three inches. In this case the average internal diameter of the mold is about nine inches, and the diameter of the holes 12 is about three inches.

Now it has been the practice in the past to fill such a mold with a measured or weighed quantity of concrete mixture which did not contain any surplus of water; and the quantity of a charge was regulated to be just enough to form the hollow concrete body. That is, the mold was not filled quite full with the mixture and then, when the mold and mixture were revolved at suitable speed in the machine about the longitudinal axis of the mold, the mixture was of course thrown to the outside and a central axial circular passage was left through the interior. But I have found that posts or other bodies thus formed require a comparatively long time to set and the resulting product lacks strength.

In my improved process I use a concrete mixture in which I place a surplus of water—more water than enough to set the mixture; but not a great deal more. The proportions of the aggregates of course are determined entirely by their relative sizes, etc.; and these proportions are usually redetermined for each new batch of materials. But the proportions of the solids does not have any specific bearing upon my process. I fill the mold, as shown in Fig. 1, entirely full with this wet cementitious mixture. The mold is usually stood on end and the lower opening 12 is closed by any suitable means, the cementitious mixture being put in through the other opening 12; and the mold is usually raised and bumped upon the floor in order to settle the mixture so that the mold may be entirely filled. The plug 14 may be then inserted in the opening 12. In usual practice I use a "gunny sack" to loosely plug the opening. The mold with its charge of cementitious material is then put in a revolving machine in which the mold and the cementitious material is revolved about a longitudinal axis, usually horizontal. The plug 14 may be removed either at the time of beginning revolution or a certain amount of revolution may be allowed to take place first and then the plug removed; but in any case the opening 12 is opened (and either one or both of the openings 12 may be opened) before the cementitious material begins to set. Under the influence of the centrifugal force the heavier solid particles move toward the outside and this of course causes the surplus water to move to the inside. There is thus set up a movement or flow of the solid matter outwardly and an opposite inward movement or flow of the surplus water, due to displacement by the heavier outwardly moving particles. A few minutes after revolution starts a longitudinal opening is developed through the entire length of the cementitious body. Prior to the development of this longitudinal opening, and perhaps even subsequent to the development of the opening, a very small amount of the solid particles may be thrown out through the end opening; but the amount is so small that it is entirely negligible. The opening at first developed through the concrete body is not as large as the openings 12; and its formation is due practically entirely to the fact that the material is being more highly compressed and made more dense by the centrifugal action. At about this same time the surplus water begins to flow inwardly into this longitudinal opening; and having reached the longitudinal opening it then flows longitudinally out through the end openings of the mold. This flow of water continues until all of the surplus water has been thrown inwardly to the central opening and has then flowed out longitudinally away from the mold. To get rid of all the laitance, the mold with its contained post may be up-turned to allow all the laitance water to run out, after rotation is completed. This surplus water carries with it the finely divided impurities which it has picked up and carried in suspension during and by reason of its inward flow through the solid material. It will be readily understood that this surplus water of course comes from all parts of the original wet cementitious mixture; so that all parts of the cementitious mixture are intimately subjected to the flow action of the inwardly moving surplus water. The amount of this surplus water may be comparatively small. In a post weighing about 800 pounds there may be from a quart to a gallon of surplus water carrying the laitance—forming a milky fluid. If this milky fluid is allowed to dry and the solid particles allowed to set and harden, a weak, clay-like substance is produced. It is this substance which, if allowed to remain in the concrete mixture, very materially weakens the concrete mixture and very materially lengthens the time necessary for its setting, and lengthens the time necessary for rotation. And I have found that if this substance is thrown to the inner wall of the hollow body and then allowed to set there (without being removed from the interior) cracks will develop in this inner layer of weak material and have a tendency to run out through the concrete.

When the operation is complete and the concrete has taken its entire set (or at least its entire initial set) an opening has been developed through the concrete body of an average diameter, in this particular case, of about three inches. It will be understood however, that the removal of the excess water is not the sole cause of this opening, but only a partial cause; the opening being caused also by the compression of the concrete by the centrifugal force. Of course the size of opening in proportion to the diameter of the concrete body depends entirely upon the amount of material put into the mold; but I have here given, as a simple illustration of my invention, a description of a process wherein the mold is entirely filled with concrete. Where it is desirable to make an opening through the concrete body larger in proportion than that herein described, I may merely put into the mold a smaller amount of concrete mixture and of course then the end openings in the mold will be comparatively larger; and I may use the mold with an interior wall, such as I will now describe.

Such a mold is illustrated in Figs. 3 and 4, where 10ᵃ designates the exterior wall of the mold; 11ᵃ designates the ends and 20 designates the interior wall which is adapted to assist in the formation of a uniform internal opening in the finished concrete body. This interior wall I make with a longitudinal opening 21, preferably throughout its length; and furthermore I make this interior wall preferably with a circular or cylindrical outer surface but with a spiral inner surface as indicated at 22; this spiral inner surface leading gradually outwardly to the opening 21. This is for the purpose of throwing such material as may initially be within wall 20 to the opening 21 and thence into the space between the two walls. In operating with such a mold I fill the space between the two walls and then within the inner wall I place a suitable additional amount of concrete mixture, all wet with a small amount of superfluous water. The amount of concrete mixture will be determined by experience and may then be regulated by measurement or weight. The process, and the action, is substantially the same as hereinabove described. The solid material is thrown outwardly and moves out through the opening 21 while the surplus water, with its suspended impurities, is thus forced to flow inwardly and flows through the opening 21 into the interior inside the wall 21 and thence flows out through the openings 12$^a$ in the end or at the ends of the mold.

While I have explained my process in some detail as applied to hollow posts or pipe of concrete, it will be readily understood that it is not limited in its nature to such articles or such material specifically, but may be applied to the formation of any articles of plastic material wherever a substance in the nature of "laitance" is present. Neither is it limited specifically to the formation of a hollow body; although the process, as will be readily understood, lends itself very efficiently to the formation of a hollow body.

Having described a preferred form of my invention, I claim:

1. The herein described process of forming a cementitious body, comprising filling a mold with a wet unset cementitious mixture containing an excess of water above the amount required to set the mixture, rotating the mold and cementitious mixture about an axis within itself, and allowing flow of the excess water out of the mixture and out of the mold along the axis of rotation continuously and simultaneously with the inward flow of the excess water to the axis.

2. The herein described process of forming a cementitious body, comprising filling a mold with an excess of wet unset cementitious mixture containing an excess of water above the amount required to set the mixture, rotating the mold and cementitious mixture about an axis within itself and thereby causing the heavier solid particles to move toward the outside and causing the excess of water to move inwardly toward the axis of rotation, and simultaneously allowing escape of such water and the particles carried in suspension along the axis of rotation, thereby inducing and maintaining a continuous flow of such excess water through the mixture toward the axis of rotation and thence out of the mass, and continuing such rotation and escape of water until the cementitious mass is set.

3. The herein described process of forming a hollow concrete body comprising introducing an excess quantity of a wet unset cementitious mixture, containing an excess of water above that required to set the mixture, into a revoluble mold, including an axially positioned tubular core, and rotating the mold and cementitious mixture to cause the solid particles of the mixture to move outwardly from said core, and provide a continuous simultaneous flow of the excess water into and longitudinally through the core, substantially as and for the purpose described.

In witness that I claim the foregoing I have hereunto subscribed my name this 14th day of June, 1919.

HENRY BARKSCHAT.

Witness:
VIRGINIA BERINGER.